United States Patent
Dourra et al.

[19]

[11] Patent Number: 6,072,390

[45] Date of Patent: Jun. 6, 2000

[54] POSITION SENSING SYSTEM FOR MANUALLY OPERATED SHIFT LEVER OF A VEHICLE TRANSMISSION

[75] Inventors: Hussein A. Dourra, Dearborn Heights; Roy S. Nassar, Rochester; Gerald L. Holbrook, Rochester Hills, all of Mich.

[73] Assignee: DaimlerChrysler Corporation, Auburn Hills, Mich.

[21] Appl. No.: 09/282,375

[22] Filed: Mar. 31, 1999

[51] Int. Cl.[7] ........................................ B60Q 1/00

[52] U.S. Cl. .................... 340/456; 340/686.1; 357/9.1; 357/10.1; 203/61.91; 203/61.37; 341/32; 341/76

[58] Field of Search ................... 340/456, 686.1; 307/9.1, 10.1; 200/61.91, 61.37; 341/32, 76

[56] References Cited

U.S. PATENT DOCUMENTS

| | | |
|---|---|---|
| 3,130,596 | 4/1964 | Gorski . |
| 3,789,688 | 2/1974 | Minks . |
| 3,876,028 | 4/1975 | Asano et al. . |
| 3,881,368 | 5/1975 | Furuhasi et al. . |
| 3,895,547 | 7/1975 | Murakami . |
| 3,898,401 | 8/1975 | Noba et al. . |
| 3,943,792 | 3/1976 | Sibeud . |
| 3,956,947 | 5/1976 | Leising et al. . |
| 4,044,634 | 8/1977 | Florus et al. . |
| 4,073,204 | 2/1978 | Dick . |
| 4,131,036 | 12/1978 | Ivey et al. . |
| 4,174,645 | 11/1979 | Ohmae et al. . |
| 4,208,925 | 6/1980 | Miller et al. . |
| 4,220,058 | 9/1980 | Petzold . |
| 4,244,244 | 1/1981 | Rembold et al. . |
| 4,258,591 | 3/1981 | Eckert et al. . |
| 4,259,882 | 4/1981 | Miller . |
| 4,271,728 | 6/1981 | Wakamatsu . |
| 4,275,612 | 6/1981 | Silvester . |
| 4,283,970 | 8/1981 | Vukovich . |
| 4,285,252 | 8/1981 | Yamaki et al. . |
| 4,290,322 | 9/1981 | Huitema . |
| 4,345,489 | 8/1982 | Muller et al. . |
| 4,429,196 | 1/1984 | Beig et al. . |
| 4,485,443 | 11/1984 | Knodler et al. . |
| 4,527,678 | 7/1985 | Pierce et al. . |
| 4,535,412 | 8/1985 | Cederquist . |
| 4,610,179 | 9/1986 | Parker . |
| 4,660,430 | 4/1987 | Bortfield et al. . |
| 4,667,540 | 5/1987 | Yagi . |
| 4,680,988 | 7/1987 | Mori . |
| 4,693,142 | 9/1987 | Kurihara et al. . |
| 4,724,723 | 2/1988 | Lockhart et al. . |
| 4,875,391 | 10/1989 | Leising et al. . |
| 4,887,491 | 12/1989 | Holbrook et al. . |
| 4,926,172 | 5/1990 | Gorsek . |
| 4,965,735 | 10/1990 | Holbrook et al. . |
| 4,998,450 | 3/1991 | Nogle . |
| 5,009,128 | 4/1991 | Seidel et al. . |
| 5,245,313 | 9/1993 | Polityka . |
| 5,304,981 | 4/1994 | Leising et al. ................. 340/456 |

(List continued on next page.)

*Primary Examiner*—Edward Lefkowitz
*Attorney, Agent, or Firm*—Marc Lorelli

[57] ABSTRACT

A sensing system for detecting the position of a manually operated shift lever in an automatic transmission. The sensing system includes a plate member movable in response to movement of a shift lever. The plate member includes a generally flat contact surface having a predetermined pattern of electrically conductive and non-conductive areas. An electrical sensor unit is mounted in the transmission and positioned to communicate with the contact surface of the plate member. At least five electrical contact members engage the conductive and non-conductive areas on the contact surface generate binary codes having combinations that are indicative of the shift lever position in each of the predetermined operating modes. The engagement between the contact members and the contact surface further generates at least four unique binary codes indicative of the transitions between the predetermined operating modes. These four unique binary codes indicate to a controller the specific transition zone the shift lever is positioned within.

12 Claims, 2 Drawing Sheets

U.S. PATENT DOCUMENTS

| | | |
|---|---|---|
| 5,325,083 | 6/1994 | Nassar et al. . |
| 5,338,907 | 8/1994 | Baker et al. . |
| 5,398,018 | 3/1995 | Polityka . |
| 5,420,565 | 5/1995 | Holbrook . |
| 5,453,732 | 9/1995 | Takano . |
| 5,512,875 | 4/1996 | Polityka . |
| 5,537,885 | 7/1996 | Thomas . |
| 5,552,761 | 9/1996 | Kazyaka . |
| 5,561,416 | 10/1996 | Marshall et al. . |
| 5,675,315 | 10/1997 | Issa et al. . |
| 5,743,143 | 4/1998 | Carpenter et al. . |
| 5,767,769 | 6/1998 | Issa . |
| 5,823,071 | 10/1998 | Petrosky et al. . |
| 5,845,538 | 12/1998 | Tornatore . |
| 5,861,800 | 1/1999 | Peters et al. . |

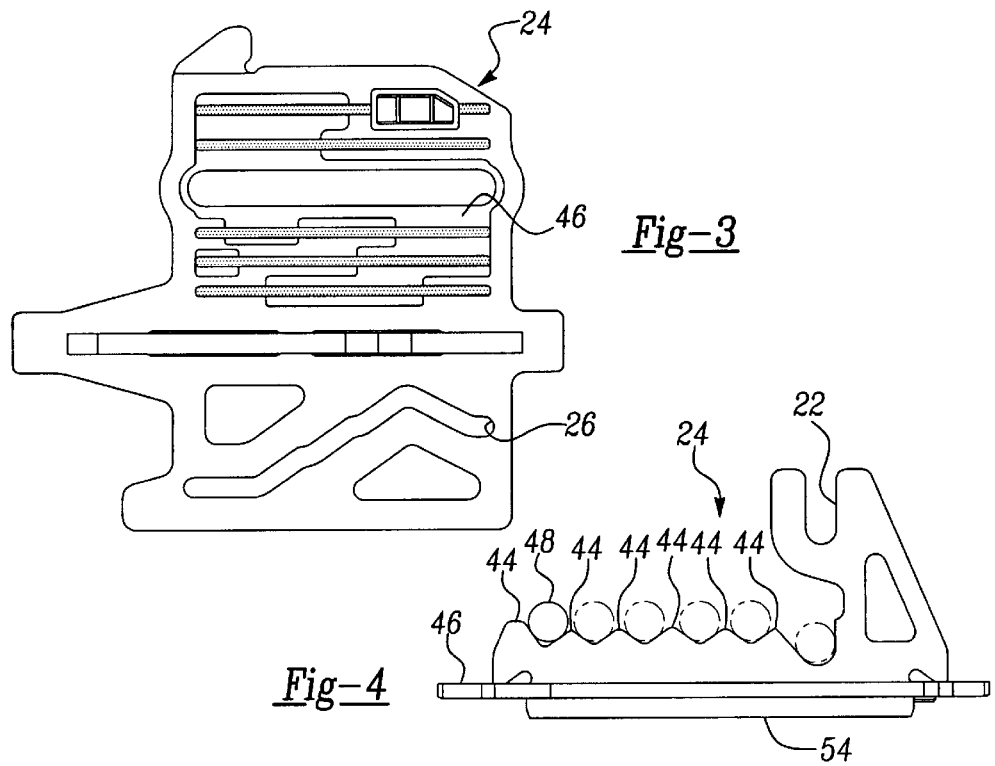
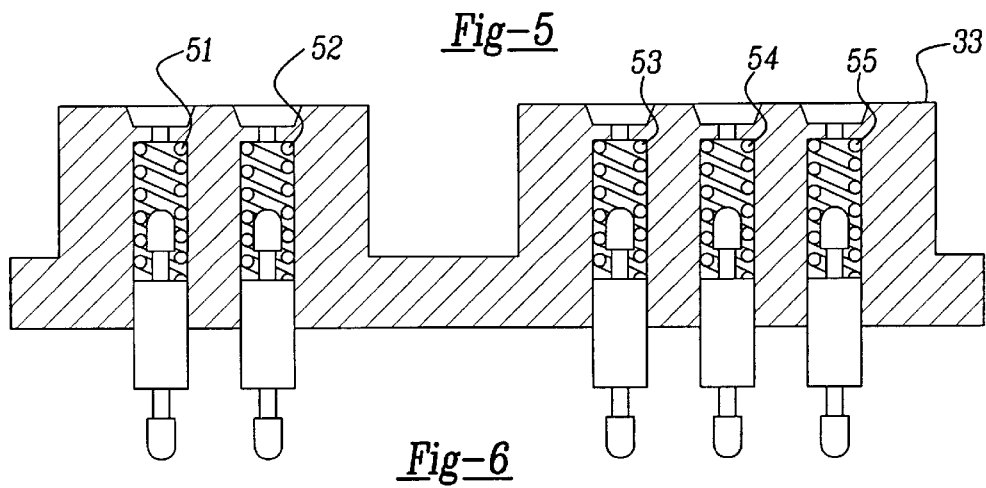

POSITION SENSING SYSTEM FOR MANUALLY OPERATED SHIFT LEVER OF A VEHICLE TRANSMISSION

CROSS-REFERENCE TO RELATED APPLICATIONS

The present application is related to the following co-pending applications, which are incorporated herein by reference:

U.S. Ser. No. 09/283,073 filed Mar. 31, 1999 for an invention entitled "LINEAR TRANSLATION OF PRNDL"; and U.S. Ser. No. 09/282,987 filed Mar. 31, 1999 for an invention entitled "CAMMING MANUAL LEVER FOR PULL-OUT LOAD."

FIELD OF THE INVENTION

The present invention relates to an automatic transmission for a vehicle and, more particularly, to a five-pin sensing system for generating codes representing the position of a manual gear select lever in an automatic transmission.

BACKGROUND OF THE INVENTION

As is well known to those skilled in the art, many automatic transmissions include control systems capable of controlling various electronically operated solenoid-actuated valves to engage various drive mechanisms of the transmission.

Currently, there exists an automatic transmission system having a fully "adaptive" control system. A thorough discussion of such a transmission control system in contained in U.S. Pat. No. 4,998,450 ('450) issued on Mar. 12, 1991 to Nogle and entitled "Neutral Start Switch To Sense Shift Lever Position," which is commonly owned by the assignee of the present application. This patent is hereby incorporated by reference. The transmission control system includes a microcomputer-based controller that receives input signals indicative of engine speed, turbine speed, output speed (vehicle speed), throttle angle position, brake application, predetermined hydraulic pressure, driver selected gear and operating conditions (PRNODDL), engine coolant temperature, and/or ambient temperature. This controller generates command or control signals for causing the activation of a plurality of solenoid-actuated valves that regulate the application and release of pressure to and from the frictional units of the transmission system.

The '450 transmission control system further discloses a neutral start switch for sensing the position of a manually operated shift lever to select between a plurality of predetermined operating modes. With reference to FIGS. 4B and 19 of the '450 patent, a plate member moves in response to a shift lever and provides a cam surface at the edge with electrically conductive and non-conductive areas. A pair of separate sensors is mounted in the transmission such that an electrical contact pin of each sensor communicates with the cam surface. The signal from the electrical contact pin of each sensor combine to generate a binary code indicative of the shift lever position. Each sensor has a first contact and a second contact. The first contact travels on the cam surface while the second contact closes whenever the first contact is extended with a groove. However, this technique eliminates some of the possible binary code combinations since the first contact generally does not conduct with the second contact closed. Consequently, changes between some of the manual shift lever operating positions involve single bit changes between the respective binary code combinations.

An attempt has been made to resolve these problems by providing a sensing system capable of generating combinations of binary codes which require two or more bit changes between any selected operating modes and further capable of improving the transition codes between the operating modes of the transmission. A thorough discussion of such a transmission sensing system is contained in U.S. Pat. No. 5,325,083 ('083) issued on Jun. 28, 1994 to Nassar et al. and entitled "Manual Valve Position Sensing System," which is commonly owned by the assignee of the present application. This patent is hereby incorporated by reference.

With reference to FIGS. 3 and 6 of the '083 patent, the sensing system includes a plate member that moves in response to the shift lever and includes a cam surface at the edge with electrically conductive and non-conductive areas. An electrical sensor unit is mounted in the transmission in a position to communicate with the contact surface of the plate member. Four electrical contact pins engage the conductive and nonconductive areas on the plate member and generate a binary code having combinations thereof that represent each of the shift lever positions. The binary code combinations are provided for the operating modes and require at least a two-bit change between any two operating modes. In addition, transition codes are provided between each of the operating modes. More particularly, with reference to FIG. 4 of the '083 patent, the sensing system includes three unique transition codes T1, T2, T3 to enable a controller to anticipate and detect transitions between given operating modes. However, this technique fails to independently detect the direction of shift lever movement. For example, transition code T2 occurs on either side of neutral (N) and transition code T3 occurs on either side of drive (D). Therefore, the controller is unable to anticipate whether the shift lever is moving from neutral (N) to reverse (R) or to overdrive (OD). Similarly, the controller is unable to anticipate whether the shift lever is moving from drive (D) to overdrive (OD) or to low (L).

Moreover, the above sensing system may not afford maximum protection against incorrect operating mode detection due to "pin bounce" or pin failure. Pin bounce is defined, for purposed of this patent application, as the momentary disengagement of a contact pin with the conductive or non-conductive areas of the plate member. This pin bounce may occur as a result of engine vibration or various other shock inputs. The pin bounce and pin failure cause the controller to detect an incorrect operating or transition code. Consequently, controller logic must be programmed to detect and ignore these false codes, which increases the complexity and cost of the sensing system.

Accordingly, there exists a need in the relevant art to provide a sensing system capable of generating combinations of binary code that overcomes the disadvantages of the prior art. Furthermore, there exists a need in the relevant art to provide unique transition codes between each of the operating modes of the transmission.

SUMMARY OF THE INVENTION

In accordance with the broad teachings of this invention, a sensing system having an advantageous construction is provided for detecting the position of a manually operated shift lever in an automatic transmission. The sensing system includes a plate member movable in response to movement of a shift lever. The plate member includes a generally flat contact surface having a predetermined pattern of electrically conductive and non-conductive areas. An electrical sensor unit is mounted in the transmission and positioned to communicate with the contact surface of the plate member. At least five electrical contact members engage the conductive and non-conductive areas on the contact surface generate binary codes having combinations that are indicative of the shift lever position in each of the predetermined operating modes. The engagement between the contact members and the contact surface further generates at least four unique binary codes indicative of the transitions between the predetermined operating modes. These four unique binary codes indicate to a controller the specific transition zone the shift lever is positioned within.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a plan view of a plate member having a contact surface composed of conductive and non-conductive areas;

FIG. 4 is a side view of the plate member;

FIG. 5 is a schematic diagram and associated table that illustrate the combinations of binary codes generated in response to the conductive and non-conductive areas on the contact surface; and FIG. 6 is a cross-sectional view of the sensing unit.

DETAILED DESCRIPTION OF THE PREFERRED EMBODIMENTS

The following description of the preferred embodiment is merely exemplary in nature and is in no way intended to limit the invention, its application, or uses.

Figure 1:
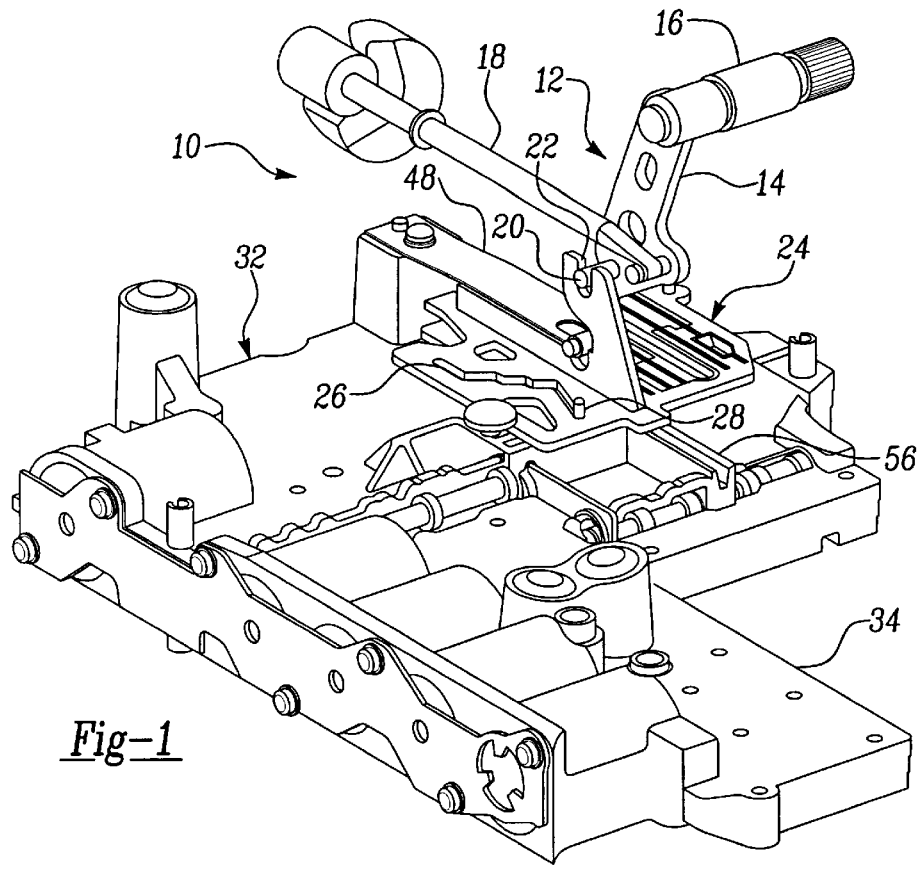
FIG. 1 is a perspective view of a valve assembly for an automatic transmission having a sensing unit removed for clarity according to the teachings of the present invention.

Referring to FIGS. 1–4, position-sensing assembly 10 is shown therein for sensing the position of a manual gear select lever in an automatic transmission. Sensing assembly 10 includes a manual valve lever assembly 12 having a metal plate 14 connected to a shaft member 16. Shaft member 16 is generally mounted within a support structure (not shown) having an opening that allows for a rotational movement of metal plate 14. Manual valve lever assembly 12 is attached to a shift rod (not shown) that is moveable by an operator of a vehicle to select amongst a plurality of transmission operating modes, such as park, reverse, neutral, drive, second, and low (PRND2L). FIG. 1 also shows that a park pawl rod 18 is connected to metal plate 14 to permit actuation of park pawl rod 18 by manual valve lever assembly 12.

Figure 2:
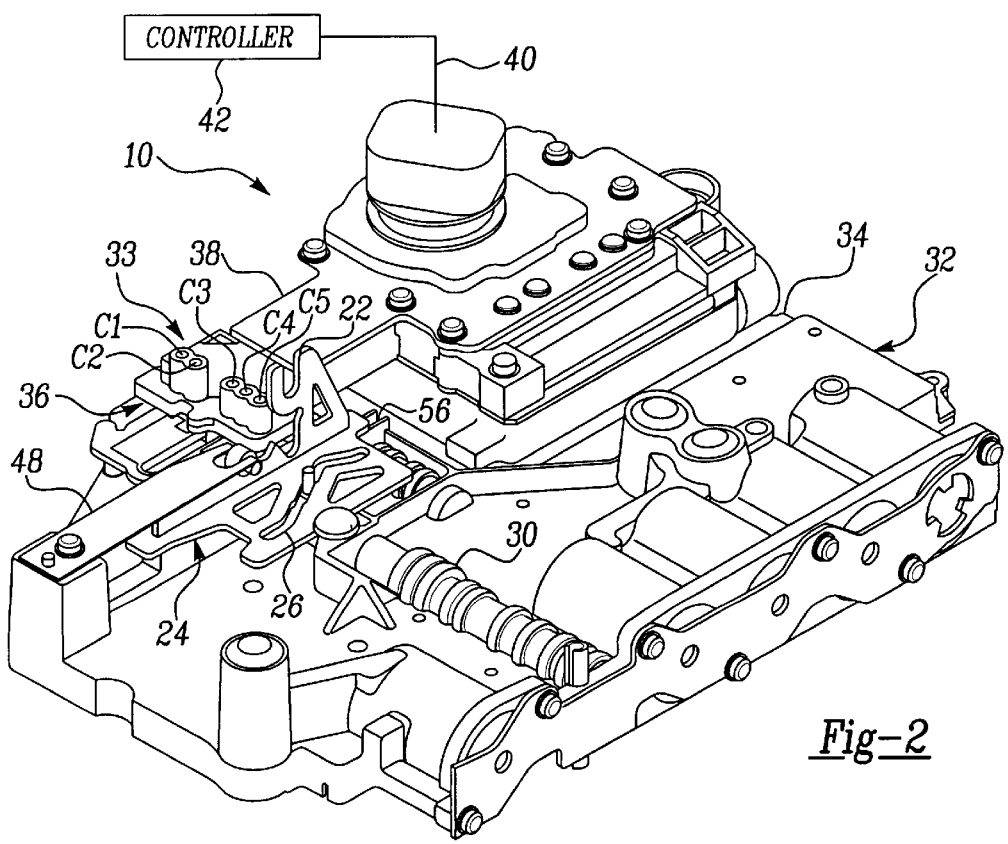
FIG. 2 is a perspective view of the valve assembly showing the sensing unit and having the manual lever removed for clarity.

Metal plate 14 rotates in response to operator input amongst positions that generally represent operating modes for an electronically controlled automatic transmission. In doing so, metal plate 14 has a pin 20 formed on metal plate 14 as shown in FIG. 1, which engages a pin slot 22. Pin slot 22 is formed within a coding plate 24. Coding plate 24 has a cam surface composed of a slot or cam groove 26 formed therein as shown in FIGS. 1–3 that engages a valve pin 28. Valve pin 28 is connected to a manually operated valve 30 for controlling the hydraulic fluid flow throughout a valve assembly 32 in an automatic transmission. As such, the rotation of metal plate 14 causes pin 20 to engage pin slot 22 so as to linearly translate coding plate 24 to predetermined positions, which in turn controls the hydraulic system of the transmission.

A sensing unit 33 is mounted above a portion of coding plate 24 for sensing the position of coding plate 24. Sensing unit 33 is fastened to a valve body 34 in a known manner. A channel 36 is provided between sensing unit 33 and valve body 34 as best shown in FIG. 2, which allows coding plate 24 to slide linearly relative to sensing unit 33.

Sensing unit 33 includes five spring loaded electrical contact pins C1 through C5 that extend therefrom and contact conductive and non-conductive areas on a contact surface on coding plate 24. In this regard, it should be understood that the electrical contact pins C1 through C5 extend in a generally perpendicular relationship to the plane of coding plate 24. Sensing unit 33 still further includes a support member 38 that supports and stabilizes sensing unit 33 and provides substantially uniform contact between each of the electrical contacts C1 through C5 and coding plate 24. Sensing unit 33 further includes an electrical connection member 40 that is connected to a transmission controller 42.

Referring now to FIGS. 3 and 4, Coding plate 24 has cam groove 26 routed therethrough to provide a cam surface for receiving the manually operated valve pin 28. As such, linear translation of coding plate 24 causes valve pin 28 to move manually operated valve 30 back and forth in accordance with predetermined valve settings. Coding plate 24 further includes raised notches 44 formed perpendicular to contact surface 46 for engaging a detent spring 48. As coding plate 24 is linearly translated, detent spring 48 engages operating notches 44 for each of the operating modes (PRND2L).

Contact surface 46 of coding plate 24 includes non-conductive areas 50 and conductive areas 52 formed thereon in a predetermined design to cooperate with contacts C1 through C5 in creating the desired binary code. As can be appreciated, nonconductive areas 50 and conductive areas 52 are orientated in a simple X-Y coordinate system to facilitate simple and convenient manufacture thereof. Therefore, improvements in accuracy may be realized relative to previous arcuate design patterns. Coding plate 24 further includes a guide rib 54 formed on the underside of coding plate 24. Guide rib 54 engages a guide channel 56 (FIGS. 1 and 2) formed in valve body 34 to ensure proper linear translation of coding plate 24.

As coding plate 24 is moved between the plurality of operating modes, non-conductive areas 50 and conductive areas 52 travel against the electrical contacts C1 through C5. In doing so, sensing unit 33 senses either conductive or non-conductive contact for each of the electrical contacts C1 through C5. Electrical contact with conductive area 52 grounds the electrical contact and thereby generates a binary "0". In contrast, electrical contact with non-conductive area 50 generates a binary code "1". The binary codes generated by each of the electrical contact C1 through C5 are then provided to transmission controller 42. Transmission controller 42 preferably compares the binary codes with predetermined combinations of binary codes to determine the position of manual valve lever assembly 12.

The binary coded combinations are illustrated in the Table in FIG. 5. Unique binary coded combinations are provided for hard events or operating modes which include park (P), reverse (R), neutral-1 (N1), neutral-2 (N2), drive (D), second (2), and low (L). In addition, transition codes T1, T2, T3, T4, and T5 are generated between each of the operating modes. To move from one operating mode to any other operating mode the binary code combinations require at least a two-bit change. The requirement of a two bit change provides additional assurance that the shift lever position is properly sensed and creates less of a likelihood of obtaining an incorrect position sensing due to a single or multiple contact failure. Likewise, a two-bit change is required between each of the transition codes T1, T2, T3, T4, and T5. In addition, the combinations of binary codes preferably do not include combinations of either all binary coded zeros or all binary coded ones. Moreover, pursuant to Federal Standards, electrical contact C1 may only be grounded in park (P) or neutral (Ni, N2), since it provides continuity for starting the engine of the vehicle.

Transition codes T1, T2, T3, T4, and T5 enable transmission controller 42 to detect transitions between every operating mode. Transition codes T1, T2, T3, T4, and T5 essentially provide for hysteresis between each of the operating mode positions (PRND2L). In addition, transition codes T1, T2, T3, and T4 separate the four hydraulic modes of operation, which are reverse (R), neutral (N), drive (D) and second (2), and thereby, provide controller 42 with known regions where hydraulic port changes are expected to occur. As a result, transition code T1 includes the hydraulic port changes between park (hydraulic neutral provided in park) and reverse. Similarly, transition code T2 includes the hydraulic port changes between reverse and neutral, and transition code T3 includes the hydraulic port changes between neutral and drive and transition code T4 includes the hydraulic port changes between drive and second. However, unlike known designs, transition codes T1, T2, T3, T4, and T5 all provide hysteresis between adjacent operating modes. Such hysteresis enables controller 42 to accurately predict the direction of movement of the shift rod by the operator.

As provided under Federal Standards, electrical contact C1, which enables continuity for starting the engine, may only engage conductive area 52 while in park (P) or neutral (N1, N2). Therefore, electrical contact C1 must engage non-conductive area 50 between park (P) and neutral (N1, N2) and from neutral (N1, N2) through remaining positions to low (L). Since incorrect operating or transition codes may be detected when more than one electrical contact C1 through C5 is changed at any one time, a multi-tier neutral position is provided. That is, neutral code N1 differs from neutral code N2 to enable transition code T2 to differ from transition code T3. This enables controller 42 to anticipate engagement of reverse mode (R) or neutral mode (N) when transition code T2 is detected. Likewise, this also enables controller 42 to anticipate engagement of drive mode (D) or neutral mode (N) when transition code T3 is detected.

FIG. 6 is a cross-sectional view of sensing unit 33 that illustrates electrical contact C1 through C5. Electrical contacts C1 through C5 are spring loaded contacts having springs S1 through S5 for providing adequate and substantially uniform force between each of electrical contacts C1 through C5 and contact surface 46 of coding plate 24.

In operation, manual valve position sensing assembly 10 monitors and determines the position of coding plate 24. A vehicle operator manually moves metal plate 14 via a shift linkage mechanism to select amongst a plurality of operating modes (PRND2L). In doing so, metal plate 14 rotates thereby linearly translating coding plate 24 along valve body 34 so that electrical contacts C1 through C5 contact non-conductive areas 50 and conductive areas 52 to generate the combinations of binary codes that represent the position of coding plate 24. The combinations of binary codes provide for operating codes which are separated by transition codes T1, T2, T3, T4, and T5. The binary coded combinations are then provided to transmission controller 42. Transmission controller 42 may thereby compare the binary codes with predetermined combinations of codes to determine the position of coding plate 24 and ensure proper operation of the transmission.

It should be appreciated that the present invention provides a unique binary code for every operating mode and every transition mode. Such arrangement is useful when used in conjunction with electronic display devices in a vehicle. Previously, if the operating mode selected by the operator was between neutral and reverse or neutral and drive, the same transition code was generated. This prevented a vehicle controller from determining the exact position of the mode select lever. Therefore, no operating mode was displayed in the electronic display under conditions when the engine has not been started. However, the present invention enables the controller to determine whether the operating mode select lever is between neutral and reverse or neutral and drive and can therefore display either reverse or drive. This enables the operator to make the appropriate changes to engage neutral (N1, N2) so that ignition start capability can be recognized.

Unique transition codes also provides a means whereby an electronic PRND2L display could also indicate the positions between the normal modes. This would yield a display more analog in appearance.

It should further be appreciated that the present invention can better accommodate pin bounce and pin failure, since the controller is better able to predict movement between the various operating modes and transition modes to determine if a detected binary code is erroneous.

While this invention has been described in connection with a linearly translated coding plate, it is not limited solely to sensing systems employing a linearly translated coding plate nor is it limited to the operating modes described herein. For example, the coding plate could be rotated rather than linearly translated. In addition, the invention may be employed with automatic transmissions having more or less predetermined operating modes.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A sensing apparatus for sensing the position of a manually operated shift lever of a vehicle transmission, said manually operated shift lever adapted to select one of a plurality of predetermined operating modes of said transmission, said sensing apparatus comprising:

a plate member movable in response to movement of the shift lever, said plate member having a generally flat contact surface, said contact surface having a predetermined pattern of electrically conductive and non-conductive areas thereon;

an electrical sensor unit mounted in the transmission and positioned to communicate with said contact surface of said plate member; and at least five electrical contact members associated with said sensor unit contacting said conductive and non-conductive areas on said contact surface, each of said contact members engaging said contact surface along one of a plurality of paths as said contact members and said contact surface move relative to one another, said engagement between said contact members and said contact surface generating binary codes having combinations that are indicative of the shift lever position in each of the predetermined operating modes, said engagement between said contact members and said contact surface further generating at least four unique binary codes indicative of the transitions between the predetermined operating modes.

2. The sensing system according to claim 1 wherein each of said at least five electrical contact members comprises a spring-loaded contact.

3. The sensing system according to claim 1 wherein said engagement between said contact members and said contact surface generates at least two unique binary codes indicative of a neutral operating mode.

4. The sensing system according to claim 1 wherein said binary codes indicative of the shift lever position has at least two binary codes that change when shifting the position of the shift lever between any two of said predetermined operating modes.

5. The sensing system according to claim 1 wherein said at least four unique binary codes indicative of the transition between the predetermined operating modes has at least two binary codes that change between each of said transition positions.

6. A position sensing system comprising:

a shift member for selecting one of a plurality of predetermined operating modes;

a plate member movable in response to movement of said shift lever, said plate member having a generally flat contact surface, said contact surface having a predetermined pattern of electrically conductive and non-conductive areas thereon;

a sensor unit having at least five electrical contact members engaging said conductive and non-conductive areas on said contact surface, each of said contact members engaging said contact surface along one of a plurality of paths as said contact members and said contact surface move relative to one another, said engagement between said contact members and said contact surface generating binary codes having combinations that are indicative of the shift lever position in each of the predetermined operating modes, said engagement between said contact members and said contact surface further generating at least four unique binary codes indicative of the transitions between the predetermined operating modes; and a controller for receiving the combinations of binary codes and comparing said binary codes with predetermined binary codes to determine the operating mode selected.

7. The position sensing system according to claim 6 wherein each of said at least five electrical contact members comprises a spring-loaded contact.

8. The position sensing system according to claim 6 wherein said engagement between said contact members and said contact surface generates at least two unique binary codes indicative of a neutral operating mode.

9. The position sensing system according to claim 6 wherein said binary codes indicative of the shift lever position has at least two binary codes that change when shifting the position of said shift lever between any two of said predetermined operating modes.

10. The position sensing system according to claim 6 wherein said at least four unique binary codes indicative of the transition between the predetermined operating modes has at least two binary codes that change between each of said transition positions.

11. In a vehicle transmission including a controller for processing and storing input signals and predetermined values and providing output signals to control friction elements of the transmission, a sensing assembly for sensing the position of a manually operated shift lever that is used to select between a plurality of predetermined operating modes of the transmission, said assembly comprising:

a plate member movable in response to movement of the shift lever, said plate member having a generally flat contact surface, said contact surface having a predetermined pattern of electrically conductive and non-conductive areas thereon;

an electrical sensor unit mounted in the transmission and positioned to communicate with said contact surface of said plate member; and at least five electrical contact members associated with said sensor unit and engaging said conductive and non-conductive areas on said contact surface, said engagement between said contact members and said contact surface generating binary codes having combinations that are indicative of the shift lever position in each of the predetermined operating modes, said engagement between said contact members and said contact surface further generating at least four unique binary codes indicative of the transitions between the predetermined operating modes.

12. The sensing assembly according to claim 11 wherein said engagement between said contact members and said contact surface generates at least two unique binary codes indicative of a neutral operating mode.

* * * * *